March 26, 1968  D. L. VE NARD  3,375,421
COMBINED TORQUER AND PICKOFF MEANS
Filed April 21, 1964  3 Sheets-Sheet 1

INVENTOR.
DAN L. VE NARD
BY
Price & Heneveld
ATTORNEYS

March 26, 1968   D. L. VE NARD   3,375,421
COMBINED TORQUER AND PICKOFF MEANS
Filed April 21, 1964   3 Sheets-Sheet 2

INVENTOR.
DAN L. VE NARD
BY
Price + Heneveld
ATTORNEYS

March 26, 1968  D. L. VE NARD  3,375,421
COMBINED TORQUER AND PICKOFF MEANS
Filed April 21, 1964  3 Sheets-Sheet 3

INVENTOR.
DAN L. VE NARD
BY
ATTORNEYS

United States Patent Office 3,375,421
Patented Mar. 26, 1968

3,375,421
COMBINED TORQUER AND PICKOFF MEANS
Dan L. Ve Nard, Grand Rapids, Mich., assignor to
Lear Siegler, Inc.
Filed Apr. 21, 1964, Ser. No. 361,506
13 Claims. (Cl. 318—18)

ABSTRACT OF THE DISCLOSURE

Basically, the subject invention provides a variable reluctance device for the simultaneous performance of both torquer and pickoff functions from the same set of windings. A rotor and a stator are provided upon each of which is formed a peripheral series of alternating teeth and slots, or spaces, between the teeth. A series of turns of a primary winding are wound, e.g., upon the stator within the slots and about the teeth thereupon to effect a series of magnetic poles. A series of turns of a secondary winding are also wound, e.g., upon the stator to effect a similar result.

An AC signal is supplied to the primary winding and, in turn, induces a signal in the secondary winding dependent upon the shape and intensity of the flux in the fields associated with the magnetic poles. The shape and intensity of this flux is, in turn, altered by movement of the rotor relative to the stator and hence such relative movement of the stator and rotor is reflected in the induced signal in the secondary winding.

The winding insertion scheme for winding the primary and the secondary within the slots includes a unique arrangement whereby center taps appear in the windings. These center taps are connected to either AC or DC sources for providing the torquing function. Further, the two portions of each of the center tap windings form adjacent arms within bridge networks, which may, if desired, be balanced to thereby isolate the sources of torquing voltage from the pickoff signals.

---

This invention relates to electrical control apparatus of the type generally referred to as pick-off and torquer devices, and more particularly to a variable reluctance combined pick-off and torquer.

Electrical pick-off and torquing devices have long been known in various electro-mechanical systems, especially in such systems which relate to gyroscopes and their control. In such systems, the pick-offs are the means for obtaining electrical signals representative of the displacement of two relatively movable members, such as a rotor and a stator, from a predetermined initial physical relationship. Torquers provide the means in these systems by which controlled forces are applied between two such relatively movable members. Initially, the pick-off and the torquing functions were performed by separate devices. Since this art has its greatest application in areas such as aviation and rocketry where weight and size are highly critical, however, in time it became apparent that these two closely related functions should if possible be combined. Accordingly, the art began to develop combination pick-off and torquing devices. At first, these devices would at any given time perform either a pick-off or a torquing function, but not both such functions. More recently, however, a few such combination devices have become known which simultaneously "pick off" the desired signals and produce the desired torquing characteristics. Although these are a considerable improvement in the art, they too suffer from serious defects.

In the first place, these devices continue to utilize separate windings to produce the pick-off and the torquing functions. Consequently, their size and weight continue to be significantly greater than modern guidance systems demand. More seriously still, in operation some of these devices develop considerable side loading effects upon their rotors, which are the result of certain inherently unbalanced radial magnetic forces.

The present invention has as one of its primary objects the provision of a variable reluctance device which will simultaneously produce pick-off and torquer functions without requiring separate windings for each of these functions.

Another object attained by the teachings herein is the provision of such a device which provides simultaneous pick-off and torquer functions by the use of the same set of windings for both.

Yet another object of this invention is the provision of a variable reluctance device having the nature just indicated, in which the set of windings which produce the pick-off and torquing functions are wound in accordance with a unique insertion scheme.

Still another object of this invention is the provision of a device of the nature indicated, wherein undesirable magnetic side loading is effectively eliminated, due to magnetic symmetry and the resulting cancellation of such forces.

A still further object of this invention is a combined pick-off and torquer which requires no filtering or discriminating components for separating direct and alternating excitation voltages one from the other.

Another object of this invention is the achievement of the simultaneous pick-off and torquing functions noted, by means of a single pair of windings which have a unique center-tap arrangement.

A still further object of this invention is a variable reluctance combination pick-off and torquer having a center-tapped primary and secondary winding which each form two of the arms of balanced bridge circuits, which in turn serve to isolate the torquer and pick-off excitation one from the other and thereby eliminate undesirable interaction between pick-off and torquer functions.

These and other additional objects and advantages will appear more clearly to those skilled in the art upon consideration of the following specification and of the accompanying drawings, wherein.

Figure 4:
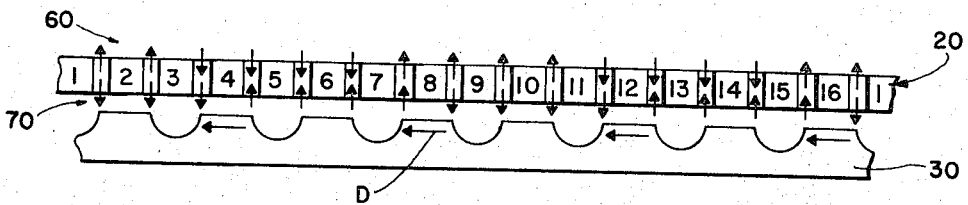
FIG. 4 is a representative drawing which serves to show the direction of the resultant torque created when stator and rotor teeth occupy the position indicated in FIG. 1.
Figure 4A:
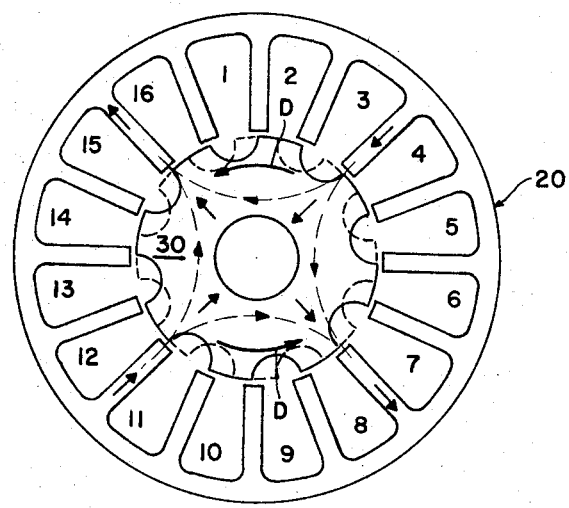

FIG. 4a is a side elevation of the exposed stator and rotor of the device, showing the initial position of the rotor, the resultant field and torque created and the position of the rotor in response to such torque. Stated briefly, this invention concerns a variable reluctance device for the simultaneous production of both torquer and pick-off functions from the same set of windings. The device comprises a rotor and a stator, upon each of which is formed a peripheral series of alternating teeth and slots, or spaces, located between the teeth. A series of turns of a primary winding is wound upon either rotor or stator, within the slots and about the teeth thereupon, thereby creating a series of magnetic poles. A series of turns of a secondary winding is also wound upon the stator or rotor to effect a similar result. Movement of the rotor relative to the stator alters both the shape and the intensity of the flux in the fields associated with the magnetic poles. The winding insertion scheme for winding the primary and the secondary within the slots includes a unique arrangement whereby center-taps appear in the windings. To these taps are connected the sources of the torquer function voltages. Also, the two portions of the tapped windings form adjacent arms within bridge networks, which may if desired be balanced, thereby isolating the sources of torquing voltage from the pick-off signals. Even more importantly, however, the unique winding scheme serves to orient the members of each magnetic pole pair which are electrically adjacent one another, one hundred eighty mechanical degrees apart, i.e., directly opposite one another, thereby accomplishing a balance of the magnetic forces acting upon the rotor of the device, and insuring that no unbalanced forces exist therein.

Figure 1:
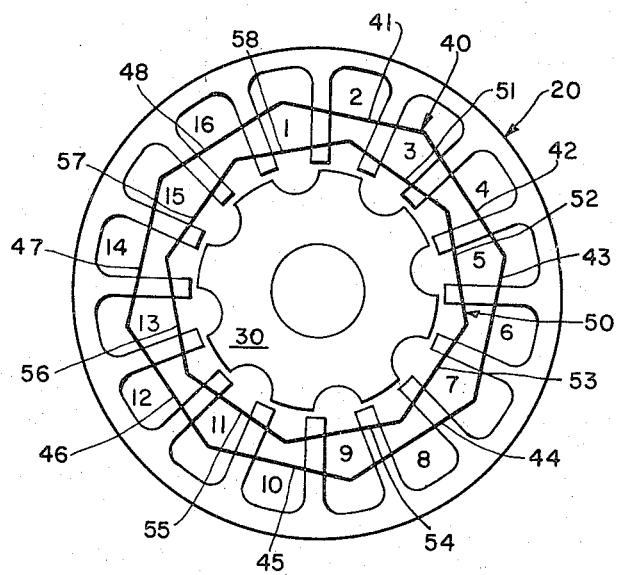
FIG. 1 is a side elevational view of the exposed stator and rotor of the device, showing features of construction and design.

Stated in more detail, and with reference now to FIG. 1 of the drawings, the physical structure of my device is seen to comprise a stator 20, which is a generally cylindrical member having a bore at its center, and a rotor 30, which is rotatably mounted within the stator bore. A series of preferably sixteen slots 1–16 is formed on the inside of the stator, leaving an inwardly-extending tooth between each two slots, as is well known. A peripheral series of slots is also formed upon the rotor 30, so that this element also has teeth. These teeth stand outwardly radially from the rotor, facing their counterparts formed on the stator 20. It is to be expressly noted that the exact number of teeth formed on the rotor and the stator may be varied to suit the particular occasion. I prefer that the stator have twice as many teeth and slots as the rotor, and that they have the following relationship. When the teeth and slots of the rotor and stator are radially aligned, each rotor tooth is sufficiently wide to coincide with approximately one half of each of two of the teeth formed on the stator. The somewhat narrower rotor slots thus become aligned with alternating, rather than successive, stator slots.

The primary winding 40, of numerous individual turns, is wound series connected and full pitch, in a manner which is described in great detail below, within the stator slots and about the stator teeth, preferably so that eight magnetic poles 41–48 inclusive will result, each pole thus embracing a pair of adjacent stator teeth. In like manner, a secondary winding 50 of many turns is wound upon the stator so as to form eight magnetic poles 51–58, each located between a pair of the magnetic poles 41–48. As may be seen in a comparison of FIGS. 2 and 2a, the secondary windings are displaced ninety electrical degrees from the primary windings.

Figure 2:
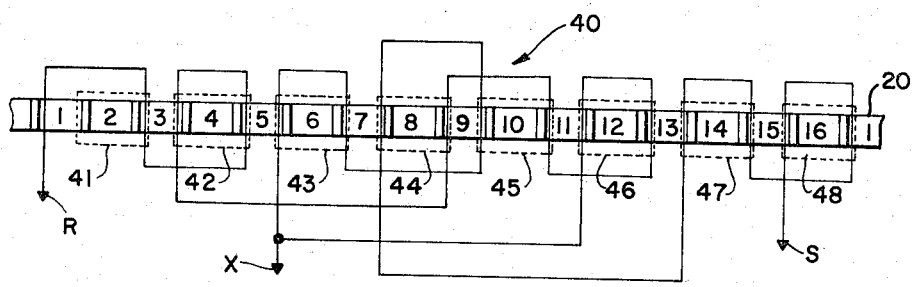
FIGS. 2 and 2a are schematic representations of the winding insertion scheme by which the primary and the secondary windings are wound upon the slots and teeth of the stator.

The winding or insertion scheme by which both the primary and the secondary windings are wound within the stator slots and about the stator teeth is illustrated in FIG. 2, wherein a development of the stator 20 is shown so as to lay out its cylindrical configuration on a flat planar surface, the stator slots being numbered the same as in FIG. 1. Now, whereas the primaries of known devices conventionally use a winding scheme which travels from slot 1 to slot 3, from slot 3 to slot 5, from slot 5 to slot 7, etc., in a continuous pattern, my unique winding scheme takes the course shown in the drawings. That is, the primary is wound from slot 1 to slot 3, and from slot 3 to slot 5, then back to slot 3, and thence all the way to slot 9, from where it proceeds to slot 11 and then to 13. It then returns to slot 11, and from there all the way back to slot 5, where the winding is tapped at point X. An additional irregularity, or crossover jumper in the winding insertion occurs after it has proceeded from tap X to slot 7, to slot 9, and back to slot 7, when it advances to slot 15. The ends R and S of the primary winding form the points at which signal voltages may be introduced during operation of the complete device, as is subsequently discussed.

As may be determined by careful examination of FIG. 2, the winding or insertion scheme just detailed develops the following order of series connected primary winding poles. Tracing the series windings from point R to point S, there occurs poles 41, 42, 45 and 46, the center tap X, and finally, poles 43, 44, 47 and 48. Comparing this order with FIG. 1, it will be seen that each pole, such as pole 41, of each electrically adjacent pole pair (one pole and the next similarly wound pole), such as 41 and 45, occupies a position upon the periphery of the stator that is diametrically opposite the other pole of the pair. For example in FIG. 1 poles 41, 42, 43, and 44 are respectively located opposite poles 45, 46, 47 and 48, although the poles of pair 41, 45, pair 42, 46, pair 43, 47 and pair 44, 48 are electrically adjacent each other.

Figure 2A:
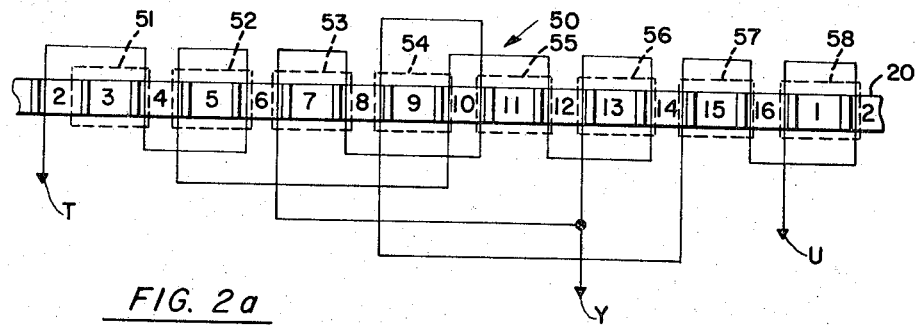

In a similar manner, and as seen by tracing the series winding in FIG. 2a, the secondary winding 50 commences its insertion at slot 2, has an irregularity between slots 4 and 10, has another irregularity between slots 12 and 6, and has another of the same between slots 8 and 14. In a manner which is similar to the primary winding, the secondary winding is centrally tapped at point Y, where it emerges for the second time from slot 12. The ends T and U of the secondary winding form the points at which an output signal voltage, induced by the primary winding into the secondary, will be found present during operation of the complete device.

As may be determined by careful examination of FIG. 2a, the insertion scheme just detailed develops the following order of series-connected secondary winding poles. From point T to point U, there occurs poles 51, 52, 55 and 56, the center tap Y, and finally, poles 53, 54, 57 and 58. Comparing this order with FIG. 1, it will be seen that each pole in each electrically adjacent pole pair occupies a position upon the periphery of the stator that is diametrically opposite the other pole in the pair.

Figure 3:
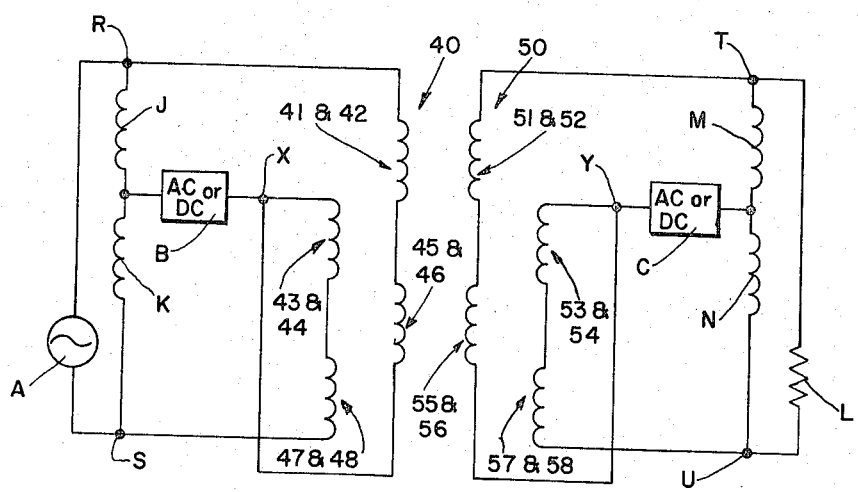
FIG. 3 is a schematic drawing of the excitation circuits of the device, showing the manner in which the various windings are themselves interconnected, and the resultant location of magnetic pole pairs.

The operational circuit into which the primary and secondary windings, 40 and 50, respectively, are to be connected is shown in FIG. 3. It is here seen that the tap X of the primary is connected to a current source B, which can be an alternating or direct current. The terminals R and S of this winding are connected to a source A of alternating current. A pair of impedances J and K are provided in this circuit, and each of these serves to connect one of the ends R and S of the primary winding to the common terminal of the source B in parallel with the source A, in the manner indicated in the drawing.

The circuit containing the secondary winding 50 is preferably symmetrical to that of the primary winding 40, just described. That is, the tap Y of the secondary winding is connected to a signal source C while the ends T and U of this winding are connected across an output load L. Impedances M and N are provided in this circuit, and serve to connect the terminals T and U of the secondary winding to a common terminal of the source C and in parallel with load L.

As indicated in FIG. 3, the magnetic pole pairs which result from the continuous primary winding 40 appear in a series connection which has characteristics that are different from what would ordinarily be expected, due to the unique insertion scheme described above.

As previously indicated, each of the poles in each electrically adjacent pair are located in the stator directly opposite each other. As seen in this figure, each such pole in an electrically adjacent pair will be energized under identical conditions. Therefore, the radial side-loading forces produced by the poles in each pair will counterbalance each other whether the device is operated as a pick-off, torquer, or combined pick-off and torquer, and there will be no resultant unbalanced forces within the device such as have caused erroneous results and actual physical damage in devices preceding my own.

In continuing reference to FIG. 3, it should be noted that unlike similar conventional circuits, my circuitry includes no filtering or discriminating components for keeping the currents of each source separate from the other source. These sources are isolated when a center-tapped primary winding is wound according to my unique insertion scheme, by providing the two impedances J and K, and selecting these so that the impedance of component J matches that portion of the primary windings which includes magnetic poles 43, 44, 47, and 48. Further, the impedance of component K is selected to match the impedance of that portion of the primary windings which includes poles 41, 42, 45, and 46. In this manner, a balanced bridge is established, with one of the sources across one set of bridge terminals and the other of the sources across the other sets of terminals. Since the bridge is balanced, the two sources are isolated from each other and any possibility of inter-action between separate functions is effectively eliminated.

The secondary half of the circuit of FIG. 3 is also preferably a balanced bridge, so that the source C will be isolated from the alternating currents which are induced into the secondary winding 50 and which are present at its load L. This is accomplished by choosing the values of impedances M and N so as to match the former with the impedance value of that portion of the winding below its center tap Y (including poles 53, 54, 57, and 58), and the latter with that portion of the winding above the tap (including poles 51, 52, 55, and 56). It should be further noted that, if a center-tapped load be used in the secondary circuit, the impedances M and N may be dispensed with, the corresponding terminal of source C then being connected directly to the load center-tap.

Operation

Having thoroughly described the structure as well as certain operational features of my device, its method of operation may already have been suggested to those skilled in the art. A brief summary of operation, however, will now be presented.

The primary windings 40 and the secondary windings 50 of FIG. 1 will, when energized, each have electrically adjacent magnetic pole pairs established therein whose poles are structurally located diametrically opposite about the inner perimeter of the stator structure 20. Each of these magnetic pole pairs has its own magnetic field, whose lines of flux lie in a magnetic circuit between the two poles and through the rotor 30. Now, since each of the rotor teeth will effectively cover two stator teeth as previously described, the lines of flux and the intensity of the field in which they lie will be altered if the rotor should be turned so that its teeth become only partially aligned with the two stator teeth, since more of a rotor slot then appears in alignment with each magnetic circuit.

Alternating current from source A (FIG. 3) is supplied to the primary winding 40, and consequently a similarly alternating current is induced into secondary 50 and appears across load L. Should the magnetic field which accomplishes this induction be varied, as by movement of the rotor in the above-described manner, the currents induced into the secondary will be altered. Thus, the alternating currents appearing across load L will be representative of movements of the rotor and these currents afford a desirable signal pick-off.

The magnetic fields created by the windings may be varied and are controlled by the sources B and C, which supply a current to the tap X of the primary and the tap Y of the secondary, respectively. For example, certain signals applied by sources B and C will establish the pattern 60 and control fields 70, which are illustrated by the vectors of FIG. 4. Specifically, it will be noted that most of the vectors passing through the teeth represent substantially opposed fields, which subtract from each other and are cancelled. Between slots 3 and 4, 7 and 8, 11 and 12, and 15 and 16, however, the fields are additive, producing a resultant field having the direction shown. This is illustrated also by the schematic of FIG. 4a, which discloses that the resultant fields are ninety degrees apart, and that they alternate in direction. Consequently, flux lines flow through the rotor 30 as shown in this figure. It also should be noted that the highest intensity of the resultant fields (in the position of the rotor as shown) does not pass through the center of the rotor teeth. As a result a torque will be created on the rotor causing it to rotate in a direction indicated by the arrows D to a position as indicated in dotted line where the highest flux intensity is through the center of the teeth. The direction of the torque created by the resultant fields may be reversed by changing the polarity of either of the sources B or C.

As indicated previously, my new and unique insertion scheme insures that each pole in a pole pair appears diametrically opposite the other, across the cylindrical stator structure 20. Also, each such pole in a pair of the same receives the same level of excitation. Therefore, the radial forces acting upon the rotor 30 of my device are always in complete balance.

It will readily be seen that I have provided a variable reluctance device which offers simultaneous pick-off and torquing functions from the same set of windings on a single core structure, thus eliminating the usual extra set of windings and providing a smaller and lighter device. Further, I have rendered the filtering and discriminating networks of known devices completely unnecessary by the provision of center-tapped primary and secondary windings whose halves are utilized as adjacent arms of balanced bridge circuits which isolate the torquer currents from the pick-off signals and eliminate undesirable inter-action between these two functions. Finally, and of very great significance, I have provided a device having all of these qualities, and in which side-loading effects have been eliminated, due to the balancing of radial forces by a unique winding insertion scheme.

While one preferred embodiment of my invention has been illustrated and described herein, the spirit of the invention and the concept underlying it clearly transcend any single species thereof. Accordingly, this spirit and inventive concept are to be measured solely as I have expressly set forth in the accompanying claims.

What is claimed is:

1. A variable reluctance device for simultaneously producing pick-off signals and torquing forces from the same windings, comprising: stator means; rotor means movable relative to said stator means; a tapped primary winding wound on one of said rotor and stator means; a tapped secondary winding also wound on one of said means; load means connected across said secondary winding; a source of alternating current connected across said primary winding; a source of current connected to the tap of said primary; and a source of current connected to the tap of said secondary; and said primary and secondary windings being arranged so that the alternating currents in said primary induce like signals into said secondary simultaneously with the production of rotor-torquing forces by said windings due to the currents flowing therein, and also arranged so that said alternating currents induced in said secondary are representative of changes in the relative position of said rotor and stator away from a predetermined initial relationship and established therebetween.

2. A variable reluctance device for simultaneously producing pick-off signals and torquing forces from the same windings, comprising: stator means; rotor means positioned within said stator and movable relative to the same; alternating slots and teeth formed on at least one of said means; a tapped primary winding wound within said slots and about said teeth on said one means; a tapped secondary winding also wound within the slots and about the teeth on said one means; load means connected across said secondary winding; a source of alternating current connected across said primary winding; a source of current connected to the tap of said primary; and a source of current connected to the tap of said secondary; said primary and secondary windings being arranged so that the alternating currents in said primary induce like signals into said secondary simultaneously with the establishment by the currents in said windings of pairs of like magnetic poles productive of rotor-torquing forces, said windings being also arranged so that said alternating currents induced in the secondary are representative of changes in the relative position of said rotor and stator away from a predetermined initial relationship established therebetween.

3. The device of claim 2, wherein each of the like magnetic poles in each of the pairs of the same is wound in a position upon said stator that is diametrically opposite the other pole of the pair.

4. A variable reluctance device for simultaneously producing pick-off signals and torquing forces from the same windings, comprising: stator means; rotor means positioned within said stator and movable relative to the same; alternating slots and teeth formed on each of said means in a manner whereby the slots and teeth of the one face their counterparts on the other; a tapped primary winding wound within said slots and about said teeth on said stator means; a tapped secondary winding also wound within the slots and about the teeth on said stator; a load connected across said secondary winding; a source of alternating current connected across said primary winding; a source of current connected to the tap of said primary; first and second impedances, each having one of their two ends connected to opposite ends of said primary winding; circuit means connecting each of the other ends of said impedances to said primary winding tap source of current; a source of current connected to the tap of said secondary; and a plurality of magnetic pole pairs established when the said currents flow in the said windings, said pole pairs including magnetic fluxes interconnecting said stator and rotor; said primary and secondary windings being arranged so that the alternating currents in said primary induce like signals into said secondary simultaneously with the production of rotor-torquing forces by the resultant of said magnetic fluxes, and so that the said fluxes and induced alternating current are altered by relative movements between said rotor and stator teeth, said alternating secondary currents thereby being made representative of any such movement.

5. The device of claim 4, wherein said first and second impedances and said tapped primary winding form a balanced bridge circuit.

6. A variable reluctance device for simultaneously producing pick-off signals and torquing forces from the same windings, comprising: stator means; rotor means positioned within said stator and movable relative to the same; alternating slots and teeth formed on each of said means in a manner whereby the slots and teeth of the one face their counterparts on the other; a tapped primary winding wound within said slots and about said teeth on said stator means; a tapped secondary winding also wound within the slots and about the teeth on said stator; tapped load means connected across said secondary winding; a source of alternating current connected across said primary winding; a source of current connected to the tap of said primary; a source of current connected to the tap of said secondary; and a plurality of magnetic pole pairs established when the currents induced by said tap-connected current sources flow in the said windings, said pole pairs including magnetic fluxes interconnecting said stator and rotor; said primary and secondary windings being arranged so that the alternating currents in said primary induce like signals into said secondary simultaneously with the production of rotor-torquing forces by the resultant of said magnetic fluxes, and so that the said fluxes and induced alternating current are altered by relative movements between said rotor and stator teeth, said alternating secondary currents thereby being made representative of any such movements.

7. A variable reluctance device for simultaneously producing pick-off signals and torquing forces from the same windings, comprising: stator means; rotor means positioned within said stator and movable relative to the same; alternating slots and teeth formed on each of said means in a manner whereby the slots and teeth of the one face their counterparts on the other; a tapped primary winding wound within said slots and about said teeth on said stator means; a tapped secondary winding also wound within the slots and about the teeth on said stator; a tapped load connected across said secondary winding so that the portions of the said secondary winding and the portions of the said tapped load form a balanced bridge circuit; a source of alternating current connected across said primary winding; a source of current connected to the tap of said primary; first and second impedances, each having one of their two ends connected to the opposite ends of said primary winding; circuit means connecting each of the other ends of said impedances to said primary winding tap source of current; a source of current connected to the tap of said secondary; and a plurality of magnetic pole pairs established when currents induced by said tap-connected current sources flow in the said windings, said pole pairs including magnetic fluxes interconnecting said stator and rotor; said primary and secondary windings being arranged so that the alternating current in said primary induces like signals into said secondary simultaneously with the production of rotor-torquing forces by the resultant of said magnetic fluxes, and so that the said fluxes and induced alternating current are altered by relative movements between said rotor and stator teeth, said alternating secondary currents thereby being made representative of any such movement.

8. A combined pick-off and torquer device, including:
a stator;
a rotor mounted concentrically therewith and movable with respect thereto;
not more than one primary winding, said primary winding wound on one of said rotor and stator;
not more than one secondary winding, said secondary winding wound on one of said rotor and stator;
a source of alternating current connected across said primary winding for inducing a signal across said secondary winding indicative of the relative position of said rotor with respect to said stator;
means connected to said primary winding for inducing a pattern field thereabout; and
means connected to said secondary winding for inducing a control field thereabout which will interact with said pattern field to effect a net torque on said rotor.

9. The invention of claim 8, additionally including:
an impedance connected across said alternating signal source in shunt with said primary winding; and
an impedance connected across said secondary winding.

10. The invention as set forth in claim 9, wherein said primary and secondary windings and said shunt and secondary winding connected impedances are each centrally tapped.

11. The invention as recited in claim 10, wherein said pattern field inducing means is connected between the center taps of said shunt impedance and said primary winding and said control field inducing means is connected between the center taps of said secondary winding and said secondary winding connected impedance.

12. The invention of claim 11, wherein said primary and secondary windings each form a plurality of series-connected coils with said secondary winding coils being displaced ninety electrical degrees from said primary winding coils.

13. The invention as recited in claim 12, wherein a magnetic pole is effected at each of said primary and secondary winding coils in response to signals from said pattern and control fields, respectively, said magnetic poles including a plurality of electrically-adjacent pole pairs, each pole whereof is physically displaced from its paired pole so as to be diametrically opposed thereto.

References Cited

UNITED STATES PATENTS

| | | | | |
|---|---|---|---|---|
| 2,488,734 | 11/1949 | Mueller | | 310—49 X |
| 3,085,192 | 4/1963 | Maier | | 336—135 X |
| 3,128,044 | 4/1964 | Packard | | 336—135 |
| 3,162,795 | 12/1964 | Cherniak | | 336—135 X |
| 3,176,206 | 3/1965 | Lund | | 310—40 X |
| 3,225,229 | 12/1965 | Packard | | 336—135 X |
| 3,323,040 | 5/1967 | Wright | | 310—49 XR |

BENJAMIN DOBECK, *Primary Examiner.*